United States Patent [19]

Sakai

[11] Patent Number: 4,588,389
[45] Date of Patent: May 13, 1986

[54] PULLEY DEVICE

[75] Inventor: Yoshitaka Sakai, Nagoya, Japan

[73] Assignee: Sakai Manufacturing Co., Ltd., Nagoya, Japan

[21] Appl. No.: 595,944

[22] Filed: Apr. 2, 1984

[30] Foreign Application Priority Data

Aug. 30, 1983 [JP] Japan ................................ 58-158383

[51] Int. Cl.⁴ ............................................. F16H 55/56
[52] U.S. Cl. ......................................... 474/43; 474/44; 474/45
[58] Field of Search ...................... 474/43, 44, 91, 179, 474/45

[56] References Cited

U.S. PATENT DOCUMENTS

| | | | |
|---|---|---|---|
| 3,516,295 | 6/1970 | Benz et al. | 474/45 |
| 3,705,517 | 12/1972 | Yamanaka et al. | 474/44 X |
| 3,739,651 | 6/1973 | Lewis | 474/44 |
| 3,811,331 | 5/1974 | Moogk | 474/44 X |

FOREIGN PATENT DOCUMENTS

| | | |
|---|---|---|
| 1750460 | 2/1960 | Japan . |
| 2029472 | 6/1972 | Japan . |
| 12085081 | 9/1981 | Japan . |

Primary Examiner—James A. Leppink
Assistant Examiner—Frank McKenzie
Attorney, Agent, or Firm—Wegner & Bretschneider

[57] ABSTRACT

A pulley device has a shaft provided at its one end with a disk extending radially outwardly therefrom, a tubular member provided at its one end with a disk extending radially outwardly therefrom and concentrically enclosing the shaft to cooperate with the disk of the shaft to define therebetween a V-shaped annular groove for a driving belt, and a roll pin extending in the shaft in the diametrical direction of the shaft so as to engage with both of the shaft and the tubular member. In order to facilitate the relative sliding movement between the shaft and the tubular member, oilless bearings are provided to both ends of the tubular member. Furthermore, an oilless bushing is disposed between the roll pin and the tubular member or the shaft to facilitate the rolling of the roll pin.

14 Claims, 8 Drawing Figures

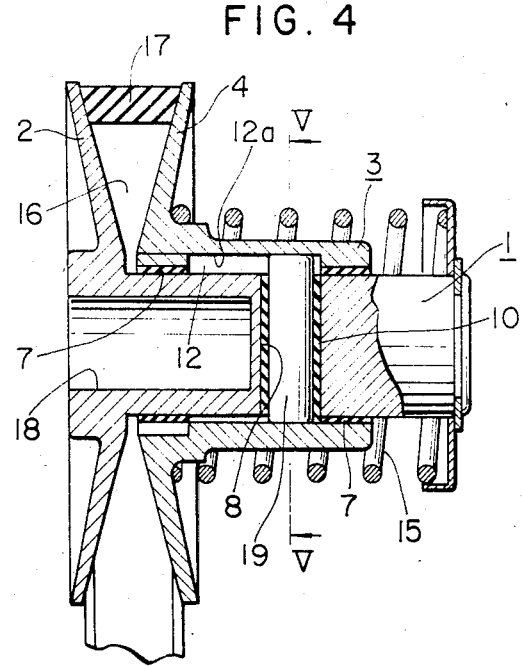
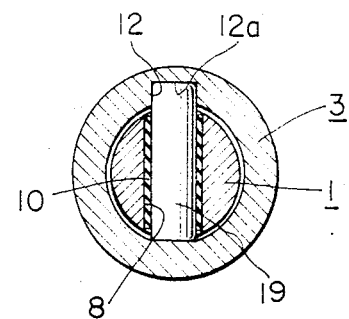

PULLEY DEVICE

BACKGROUND OF THE INVENTION

1. Field of the Invention

The present invention relates to a pulley device and more particularly to a pulley device preferably adapted to be used in a belt driven stepless transmission apparatus.

2. Description of the Prior Art

Such a pulley device has been known as having a shaft provided at one end thereof with a disk extending radially outwardly therefrom, a tubular member enclosing the shaft, and being provided at one end thereof with a disk extending radially outwardly therefrom and cooperating with the disk of the shaft to define therebetween an annular groove having a V-shaped cross-section so as to receive a driving belt, and a rotating key extending axially in engagement with both of the shaft and the tubular member so as to prevent a relative rotation thereof. In these known pulley devices, the rotating key undergoes a large mechanical friction in an axial direction thereof, as well as in a rotational direction around its axis. A wear caused by such friction results in a heavy impact and vibration, so that a loss in the torque transmission is increased and a durability of the pulley device is impaired.

In order to avoid these problems, Japanese Patent No. 277496 (Japanese Pat. Publication No. 17504/61) proposes a pulley device in which an elastic member having a shock absorbing and abraison resistant elastic surface is disposed between the shaft and the key engaging the tubular member so as to prevent the rotating key to undergo the mechanical friction in the rotational direction. In this pulley device, however, the torque transmission loss is undesirably increased due to the presence of the elastic member between the shaft and the tubular member. In addition, the rotating key is worn rapidly because no specific consideration is made to the rotating key so as to avoid the mechanical friction in the axial direction thereof.

SUMMARY OF THE INVENTION

Accordingly, it is a primary object of the invention to provide a pulley device improved to eliminate the above-described problems of the prior art.

To this end, according to the invention, there is provided a pulley device comprising: a shaft which is provided at one end portion thereof with a first disk extending radially outwardly therefrom, one surface of the first disk being inclined with respect to a plane perpendicular to an axis of the shaft; a tubular member which is provided at one end portion thereof with a second disk extending radially outwardly therefrom, one surface of the second disk being inclined with respect to a plane perpendicular to an axis of the tubular member, the tubular member slidably and concentrically enclosing the shaft so as to define between the first and second disks an annular groove for a driving belt, an axial width of the annular groove being progressively increased along a radial direction thereof; and means for urging the tubular member toward the first disk; wherein the pulley device further comprises roll pin means diametrically extending within the shaft and engaging with both of the shaft and the tubular member, and bearing means for bearing at least one portion of the roll pin means.

The above and other objects, features and advantages of the invention will become clear from the following description of the preferred embodiments taken in conjunction with the accompanying drawings.

BRIEF DESCRIPTION OF THE DRAWINGS

FIG. 4 is a sectional view of a second embodiment of the pulley device of the invention;

FIG. 5 is a sectional view taken along the line V—V of FIG. 4;

DESCRIPTION OF THE PREFERRED EMBODIMENTS

Figure 1:
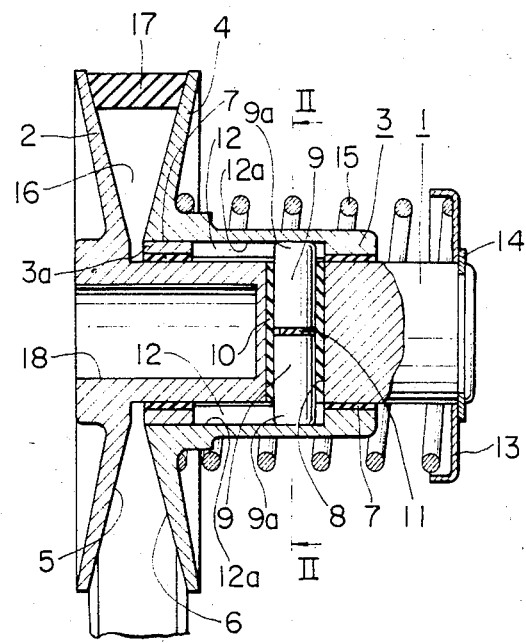
FIG. 1 is a sectional view of a first embodiment of the pulley device in accordance with the invention.

Throughout the drawings, the same reference numerals are used to denote the same parts or members.

Figure 2:
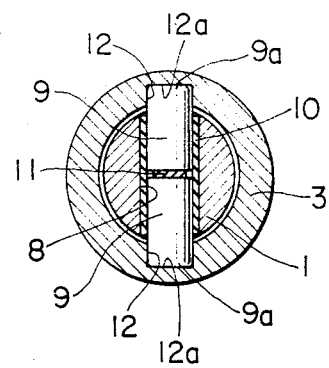
FIG. 2 is a sectional view taken along the line II—II of FIG. 1.
Figure 3:
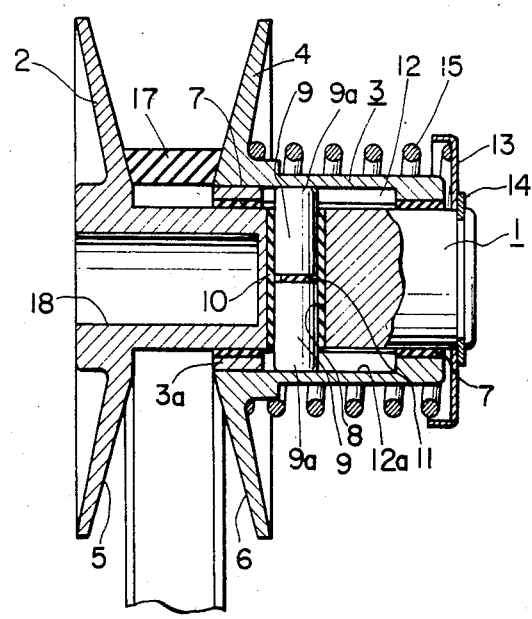
FIG. 3 is a sectional view of the pulley device shown in FIG. 1 in which an effective diameter is changed.

FIGS. 1 to 3 show a first embodiment of a pulley device of the invention. The pulley device has a shaft 1 provided at one end thereof with a disk 2 extending radially outwardly therefrom. The pulley device further has a tubular member 3 which also is provided at one end thereof with a disk 4 extending radially outwardly therefrom. A surface 5 of the disk 2 facing the other end of the shaft 1 is inclined with respect to a plane perpendicular to an axis of the shaft 1. Similarly, a surface 6 of the disk 4 facing one end of the tubular member 3 is inclined with respect to a plane perpendicular to an axis of the tubular member 3. The tubular member 3 slidably and concentrically surrounds the shaft 1 through oilless bushings 7 which are firmly and forcefully fitted to the respective inner end wall portions of the tubular member.

The term "oilless" is used in this specification to mean materials having self-lubricating nature.

The shaft 1 is provided therein with a radial through bore 8 in which keys or two roll pins 9 are inserted in series. In order to facilitate the rotation of the pin 9 around its own axis, an oilless bearing or bushing 10, e.g. porous metal bushing or synthetic resin bushing, is disposed between the bore 8 and the pins 9,9 to cover the pins 9,9 at least partially. An oilless bearing 11 is interposed between two roll pins 9 and 9. Each pin 9 has an end 9a which projects radially outwardly from an outer peripheral surface of the shaft 1.

Axially elongate grooves 12,12 for slidably receiving the projected ends 9a,9a of the pins 9,9 are formed in diametrically opposing portions of the inner peripheral wall of the tubular member 3. The grooves 12,12 are formed to prevent the pin 9 from moving in the axial direction thereof and from rotating around the axis of the shaft 1, but to allow the pin 9 to rotate around the axis of itself along the groove 12.

In order to assemble the shaft 1 and the tubular member 3 into a pulley device, the end of the tubular member 3 adjacent to the disk 4 has an inner diameter which is slightly greater than a distance between bottoms 12a of the grooves 12. The shaft 1 receiving the pins 9,9 within the through bore 8 thereof is inserted into the tubular member 3 through the large-diameter portion of the latter so that an annular groove 16 for receiving a driving belt 17 is defined between two disks 2 and 4. After the ends 9a,9a of the pins 9,9 are received by the grooves 12,12, the large-diameter portion of the tubular member 3 is closed by an annular member 3a to which the oilless bushing 7 is forcefully fitted. The annular member 3a is integrated with the tubular member 3 by, for example, welding.

A push disk plate 13 is disposed on an end of the tubular member 3 remote from the disk 4 and retained by a retainer ring 14. A spring 15 is disposed between the push disk plate 13 and the disk 4 so as to urge the disk 4 towards the disk 2 thereby to make these disks 2 and 4 hold the driving belt 7 therebetween. The annular groove 16 is so-called annular V-shaped groove an axial width of which is progressively increased along a radius thereof, i.e. radially outwardly.

As will be seen from FIGS. 1 and 3, it is possible to vary the effective diameter of the pulley device to vary the speed changing ratio by moving the tubular member 3 in the axial direction with respect to the shaft 1. A reference numeral 18 denotes a mounting hole formed in the shaft 1 for mounting a driving shaft, such as a rotor shaft of a motor, or a driven shaft.

In another embodiment of the invention, in which an axial groove is formed only in one portion of the inner peripheral wall of the tubular member. Thus, in this embodiment, the end of only one pin is received by the axial groove, while the end of the other pin is held in contact with the inner peripheral wall of the tubular member.

In these embodiments, when a change of the effective diameter is required, the tubular member 3 can be moved smoothly with respect to the shaft 1 by means of the provision of the oilless bushings 7,7. In addition, the roll pins 9,9 are allowed to roll smoothly and lightly along the grooves 12,12 by means of a lubricating effect offered by the oilless bushings 10,11. Consequently, no friction takes place between the pins 9,9 and the grooves 12,12 at the time of speed changing operation. The friction around the pin 9 in the axial direction thereof is also eliminated because an outer periphery of the pin 9 is born by the oilless bushing 10. Thus, the axial movement of the pin 9 is made under sufficient lubrication so that no substantial friction occurs as a result of this axial movement.

In the first embodiment of the invention in which both of the roll pins 9,9 are received at their ends by the grooves 12,12, and both roll pins rotate in opposite directions. This, however, does not cause substantial problem because the roll pins 9,9 are mounted independently of each other.

FIGS. 4 and 5 show still another embodiment in which a sole long roll pin 19 is received by the through bore 8 with an oilless bushing 10 interposed therebetween. Only one end of the sole long roll pin 19 is received by a sole groove 12 formed in the inner peripheral wall of the tubular member 3, while the other end of the pin 19 merely contacts the inner peripheral wall of the tubular member 3. In this case, the axial movement of the roll pin is also conducted under sufficient lubrication so that no friction takes place. In this embodiment, although only one long roll pin is used instead of two short pins, the rolling movement of the long roll pin is made in a quite smooth manner because the sole long roll pin is received only at one end thereof by the groove.

Figure 6:
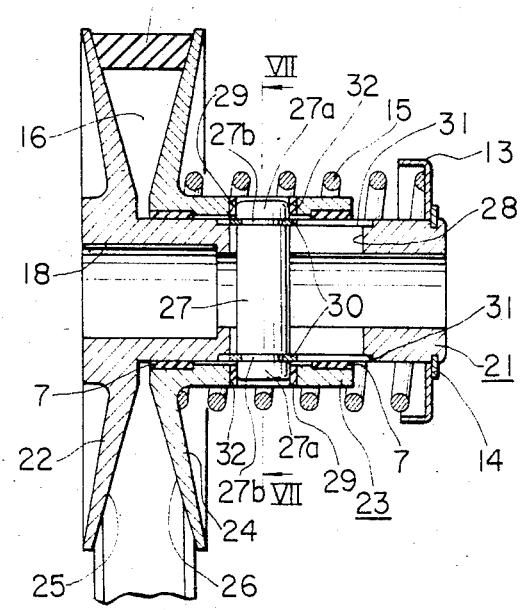
FIG. 6 is a sectional view of a third embodiment of the pulley device.
Figure 7:
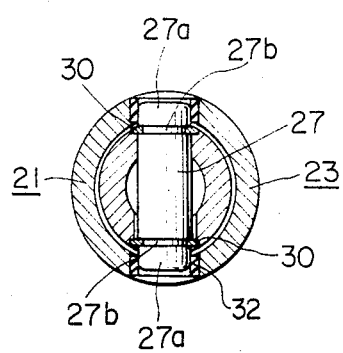
FIG. 7 is a sectional view taken along the line VII—VII of FIG. 6.
Figure 8:
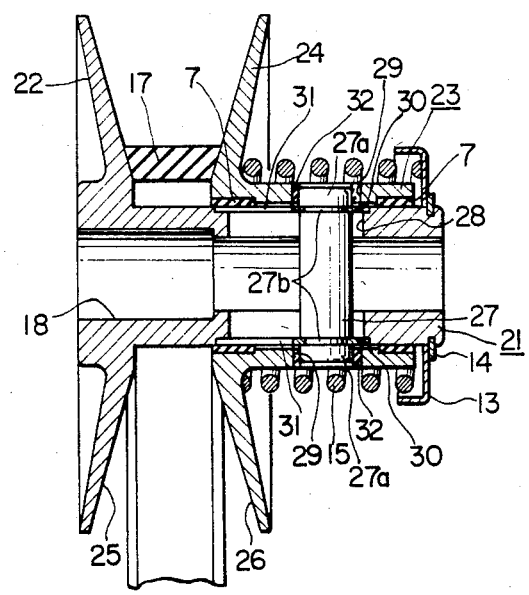
FIG. 8 is a sectional view of the pulley device shown in FIG. 6 in which an effective diameter is changed.

FIGS. 6 to 8 show an embodiment in accordance with another aspect of the invention. In these Figures, a reference numeral 21 designates a hollow shift provided at one end thereof with a disk 22 extending radially outwardly therefrom, while a numeral 23 denotes a tubular member provided at one end thereof with a disk 24 extending radially outwardly therefrom. A surface 25 of the disk 22 facing the other end of the hollow shaft 21 is inclined with respect to a plane perpendicular to an axis of the shaft 21. Similarly, a surface 26 of the disk 24 facing one end of the tubular member 23 is inclined with respect to a plane perpendicular to an axis of the tubular member 23. The tubular member 23 surrounds the shaft 21 slidingly and concentrically through oilless bushings 7,7 fitted formly and forcefully to the respective inner end wall portions of the tubular member 23, so that an annular groove 16 for a driving belt 17 is formed between two disks 22 and 24.

An elongated through bore 28 is formed in the shaft 21 so as to receive a sole roll pin 27 axially slidably and rotatably around an axis of itself but not rotatably around an axis of the shaft 21. The opposite ends 27a,27a of the roll pin 27 are extended into openings 29,29 formed in wall portions of the tubular member 23, which are radially coincidental with each other. In order to position the roll pin 27, an annular groove 27b for a snap ring 30 is formed in two peripheral portions of the roll pin 27 adjacent to the inner peripheral surface of the tubular member 23. Seats 31,31 for the snap rings are formed to axially extend on peripheral portions of the hollow shaft 21 adjacent to openings of the elongate through bore 28.

In order to facilitate the rotation of the roll pin 27 around its own axis, an oilless bushing 32 is disposed between the opening 29 of the tubular member 23 and the roll pin 27 so as to partially cover the pin 27.

In assembling the pulley device, at first the hollow shaft 21 is inserted into the tubular member 23 until the openings 29,29 in the tubular member 23 are aligned with the elongate through bore 28 in the hollow shaft 21. Then, the roll pin 27 is inserted through the openings 29,29 and the elongate radial through bore 28. The snap ring 30 is inserted into the annular groove 27b of the roll pin 27 by means of an appropriate conventional tool (not shown) to position the roll pin 27. Then, a spring 15 is disposed between the disk 24 and a push disk 13 which is supported by a retainer ring 14 disposed at the other end of the hollow shaft 21 so as to urge the disk 24 towards the disk 22 to make these disks hold the driving belt 17 therebetween. Finally, the oilless bushing 32 is interposed between the opening 29 and the roll pin 27.

In this embodiment, when the tubular member 23 is moved in an axial direction thereof with respect to the hollow shaft 21 to vary an effective diameter of the pulley device, the tubular member 23 can move smoothly by a small force by means of the provision of the oilless bushing 7. In addition, since both ends 27a,27a of the roll pin 27 are received by the openings 29,29 of the tubular member 23 through the oilless bushings 32,32, the roll pin 27 can roll along the openings of the elongate through bore 28 under sufficient lubrication, so that no friction takes place between the roll pin 27 and the openings 28 during the speed changing operation of the pulley device. Furthermore, the oilless bearing 32 provides a sufficient lubrication for an axial movement of the roll pin 27 without any friction. The direction of rotation of the roll pin 27 is not changed because the roll pin 27 rolls along the openings of the elongate through bore in the shaft 21. Thus, the movement and rotation of the roll pin are made in a quite smooth manner.

As has been described, according to the invention, the mechanical friction between the roll pin and the groove or between the roll pin and the bore opening and the wear of these parts are eliminated. Consequently, the rolling of the roll pin can be made very smoothly and securely even if there is a slight play of the roll pin in the axial direction. It is, however, possible to improve the speed changing performance at large speed changing ratio peculiar to the rolling operation and to attain a stable and reliable operation over a long period of time. Thus, the pulley device of the invention can be used suitably in machines and equipment which are required to have a high speed changing characteristics, quick response and high precision of rotation control, such as transmissions of automobiles, reduction gear for spindle of machine tool and so forth. In addition, the pulley device of the invention can be used suitably in various automatic control devices which operate under electronic control because the pulley device of the invention can quickly and surely respond to commands given by the electronic controller without any torque transmission loss.

What is claimed is:
1. A pulley device comprising:
   a shaft provided at one end portion thereof with a first disk extending radially outwardly therefrom, one surface of said disk being inclined with respect to a plane perpendicular to an axis of said shaft said shaft also provided with a radial through bore;
   a tubular member provided at one end portion thereof with a second disk extending radially outwardly therefrom, one surface of said second disk being inclined with respect to a plane perpendicular to an axis of said tubular member; said tubular member slidably and concentrically enclosing said shaft so as to define between said first and second disks an annular groove for a driving belt, the axial width of said annular groove being progressively increased along a radial direction thereof, said tubular member having at least one axial groove provided on an inner peripheral wall thereof;
   means for urging said tubular member toward said first disk;
   roll pin means diametrically extending within said shaft and engaging with both of said shaft and said tubular member by having been inserted into said bore, at least one end of said pin roll means being received in said at least one axial groove; and
   bearing means for bearing at least one portion of said roll pin means, said bearing means being disposed between said roll pin means and said bore to permit rotational movement of said roll pin means.
2. A pulley device according to claim 1, wherein said bearing means consists of oilless bushings.
3. A pulley device according to claim 1, wherein said roll pin means consists of a sole roll pin.
4. A pulley device according to claim 2, wherein said oilless bushing is made of a porous bearing metal.
5. A pulley device according to claim 2, wherein said oilless bushing is made of a synthetic resin material.
6. A pulley device according to claim 1, wherein said roll pin means comprises two roll pins, said inner peripheral wall of said tubular member is provided with two axial grooves diametrically opposing to each other, and one end of each of said roll pins is received by the respective axial grooves.
7. A pulley device according to claim 1, wherein said shaft is provided with an axial elongate and radial through bore, said tubular member is provided with a pair of through openings which are diametrically aligned with each other, said roll pin means is disposed in said through bore and said openings and is prevented by retaining means from dropping out from said bore, and said bearing means is disposed between said roll pin means and said through openings of said tubular member.
8. A pulley device according to claim 7, wherein said bearing means consists of oilless bushings.
9. A pulley device according to claim 8, wherein said roll pin means consists of a sole roll pin.
10. A pulley device according to claim 8, wherein said oilless bushing is made of a porous bearing metal.
11. A pulley device according to claim 8, wherein said oilless bushing is made of a synthetic resin material.
12. A pulley device according to claim 7, wherein said retaining means comprises a retaining ring adapted to be fitted to an annular groove formed on an outer periphery of said roll pin means, and a seat for said retaining ring formed on an outer periphery of said shaft.
13. A pulley device according to claim 1, wherein said urging means comprises a helical spring disposed between the other surface of said second disk and a push disk plate provided on the other end portion of said shaft.
14. A pulley device comprising:
   a shaft provided at one end portion thereof with a first disk extending radially outwardly therefrom, one surface of said first disk being inclined with respect to a plane perpendicular to an axis of said shaft;
   a tubular member provided at one end portion thereof with a second disk extending radially outwardly therefrom, one surface of said second disk being inclined with respect to a plane perpendicular to an axis of said tubular member, said tubular member slidably and concentrically enclosing said shaft so as to define between said first and second disks an annular groove for a driving belt, the axial width of said annular groove being progressively increased along a radial direction thereof;
   means for urging said tubular member toward said first disk;
   roll pin means diametrically extending within said shaft and engaging with both of said shaft and said tubular member; and
   bearing means for bearing at least one portion of said roll pin means;
   wherein said shaft is provided with a radial through bore, said roll pin means is inserted into said bore, said bearing means is disposed between said roll pin means and said bore for permitting not only a rotational movement of said roll pin means about an axis thereof, but a slidable movement of said roll pin means along the axis thereof relative to said shaft, at least one axial groove is provided on an inner peripheral surface of said tubular member, at least one end of said roll pin means is received in said axial groove, and opposite ends of said roll pin means are engaged with a wall of said tubular member to restrict movement of said roll pin means along the axis thereof relative to said tubular member.

* * * * *